United States Patent [19]

Sheckles

[11] Patent Number: 5,445,435
[45] Date of Patent: Aug. 29, 1995

[54] CORRUGATED TEMPORARY SEAT

[75] Inventor: Harold Sheckles, Fremont, Ind.

[73] Assignee: Kelly Box & Packaging Corporation, Fort Wayne, Ind.

[21] Appl. No.: 177,461

[22] Filed: Jan. 5, 1994

[51] Int. Cl.⁶ .................................................. A47C 7/16
[52] U.S. Cl. ............................. 297/440.12; 297/452.12
[58] Field of Search ........... 297/440.1, 440.12, 452.12, 297/452.1

[56] References Cited

U.S. PATENT DOCUMENTS

| | | | |
|---|---|---|---|
| 3,126,140 | 3/1964 | Lizan et al. | 229/16 |
| 3,149,880 | 9/1964 | Steuer | 297/440 |
| 3,312,503 | 4/1967 | Suzuki | 297/442 |
| 3,463,546 | 8/1969 | Giebel | 297/440 |
| 3,717,377 | 2/1973 | Johnson | 297/440 |
| 3,837,719 | 9/1974 | Barron | 297/440.12 X |
| 4,085,970 | 4/1978 | Klein | 297/440 |
| 4,556,253 | 12/1985 | Geneve et al. | 297/440.12 |
| 4,648,658 | 3/1987 | Calco | 297/440.12 |
| 4,804,230 | 2/1989 | Friedman | 297/440.12 |
| 4,811,987 | 3/1989 | Volpe et al. | 297/440 |
| 4,813,744 | 3/1989 | Scalisi et al. | 297/440 |
| 4,841,882 | 6/1989 | Ehrman | 297/440.12 X |
| 4,871,061 | 10/1989 | Schneider et al. | 206/326 |
| 4,984,848 | 1/1991 | Scalisi et al. | 297/440.12 |

Primary Examiner—Kenneth J. Dorner
Assistant Examiner—Milton Nelson, Jr.
Attorney, Agent, or Firm—Baker & Daniels

[57] ABSTRACT

A corrugated, temporary seat is disclosed useful in short duration driving of vehicles. The seat includes front, rear, top and side panels attached together forming a substantial box shape. Attachment locations are included to which grommets are disposed, to spread the load from the seat to the vehicle floorboard. A separate seat support is attached to the underside of the top panel to redistribute forces impacting the top panel. Integral post members are utilized to stably secure the front of the seat while an upstanding back support prevents a person from slipping from the seat.

17 Claims, 2 Drawing Sheets

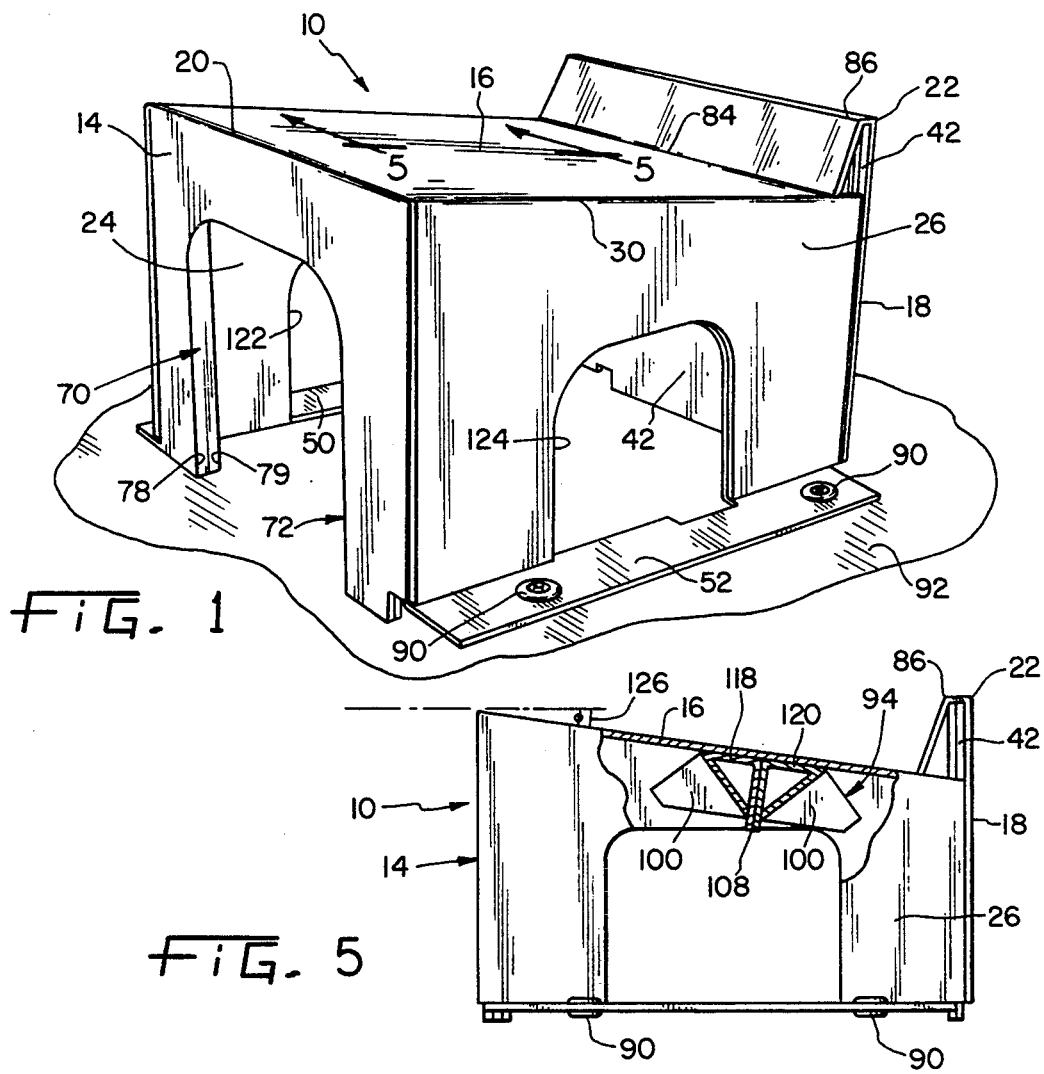
FIG. 1
FIG. 5
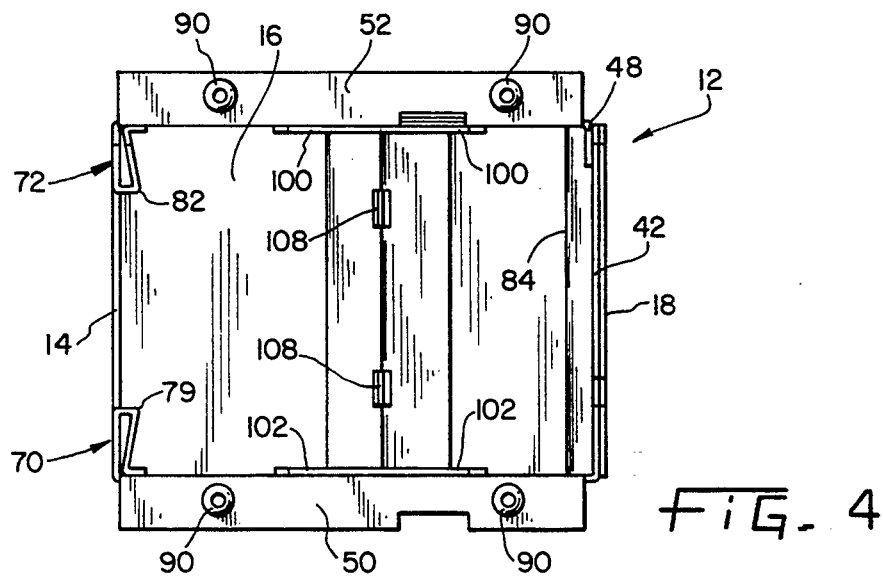
FIG. 4

CORRUGATED TEMPORARY SEAT

BACKGROUND OF THE INVENTION

The present invention relates to the construction of seats from paperboard or other fiberboard, and, more particularly, relates to a corrugated temporary seat useful in short duration driving of vehicles.

The production of non-standard vehicles, known as non-conforming trucks and vans, utilize the use of off factory site customizers and detailers. After initial assembly, vehicles are sent to off-site customizers for installation of specialized interiors, panels, dashboards and seats. Because the vehicle seat will normally be supplied by the off-site customizer, a standard vehicle seat is not utilized. A temporary seat is attached to these non-standard vehicles to permit factory personnel to drive the vehicle from the plant to a vehicle trailer and then from the trailer about the customizer's shop.

Current temporary seats comprise steel risers bolted to the vehicle frame or floorboard with a corrugated pad screwed to the top. After the vehicle is at the proper location within the customizer's shop, the temporary seat is removed and a customized seat is installed. The total drive time for these temporary steel seats is normally 10 minutes or less.

Further, these seats made from metal are designed as throw away seats, having a detrimental environmental impact while wasting resources. Additionally, these metal seats are expensive, particularly since they were used for a short time in one vehicle.

Prior art cardboard seats, such as shown in U.S. Pat. Nos. 4,813,744 and 4,811,987 disclose prior art paperboard seats for temporary use. These seats do not include any means for attaching the seat to a vehicle. Additionally, these cardboard seats would not meet the safety demands of government regulations relating to vehicle seat requirements.

The present invention is directed to overcome the aforementioned problems associated with prior temporary seats, wherein it is desired to provide a recyclable, economical, corrugated temporary seat of superior strength, for short duration driving of vehicles.

SUMMARY OF THE INVENTION

The present invention overcomes the disadvantages of the above described prior art temporary steel seats by providing an economical, corrugated temporary seat for attachment to a vehicle useful for short duration driving.

Generally, the invention provides a temporary seat for a vehicle formed from blanks of corrugated paperboard. Panels of the corrugated blank are folded to form a substantially boxed shape seat with a second sheet of material attached to form an internal seat support. Brass grommets are connected to flange locations along the bottom edge of the seat for solid attachment of the seat to the floorboard of a vehicle.

More specifically, the invention provides a specialized underside seat structure, formed in a pyramid type shape and attached to the seat, to increase the weight carrying capacity of the structure. A double folded back support is utilized to prevent a person from sliding off the seat while in use. The brass grommets attached to the seat bottom edge prevent seat movement when the seat is bolted to the vehicle. Integral post members are created in the front of the seat to further increase the weight carrying capacity of the seat.

An advantage of the corrugated temporary seat of the present invention is that the seat is designed structurally strong. The addition of the pyramid shaped underseat support spreads passenger weight throughout the structure thereby improving seat load characteristics.

Another advantage of the corrugated temporary seat is that the seat fits the standard floorboard holes of vehicles, as they are currently used. No modification of the vehicle is necessary for seat attachment. The addition of the grommets permit factory personnel to sufficiently torque down the seat to the floorboard without fear of seat rupture while providing a mechanism to evenly spread forces through the seat.

Yet another advantage of the corrugated temporary seat of the present invention is of its high ergonomic design that makes it comfortable to use, and easy to attach to a vehicle.

A further advantage of the corrugated temporary seat is that of its integral post member construction increasing the total weight carrying capacity of the seat. These post members are created from the main blank without any additional sheet material.

Another advantage of the corrugated temporary seat of the present invention is that the seat eliminates the need for one use steel seats used for vehicle transportation from the factory to a customizer's shop. The seat is designed to be totally recyclable.

The invention, in one form thereof, provides a seat of corrugated paper comprising a first sheet of material having panels defined by fold lines forming a front panel, top panel, first rear panel, and at least two side panels. Each panel includes an attachment portion to which at least one other panel attaches, with the panels forming a substantial box shape. When folded, the front and rear panels oppose each other as do each side panel. A second sheet of material is formed into a tube which attaches to the top panel and a pair of opposing panels whereby the weight bearing capacity of the seat is increased.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a perspective view of the assembled temporary seat of one form of the present invention;

FIG. 4 is a bottom view of the assembled seat, with the seat attached to the underside of the top panel.

FIG. 5 is a side, partially sectional view of the assembled seat taken along line 5—5 of FIG. 1, shown with the seat support attached;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figures 2, 3:
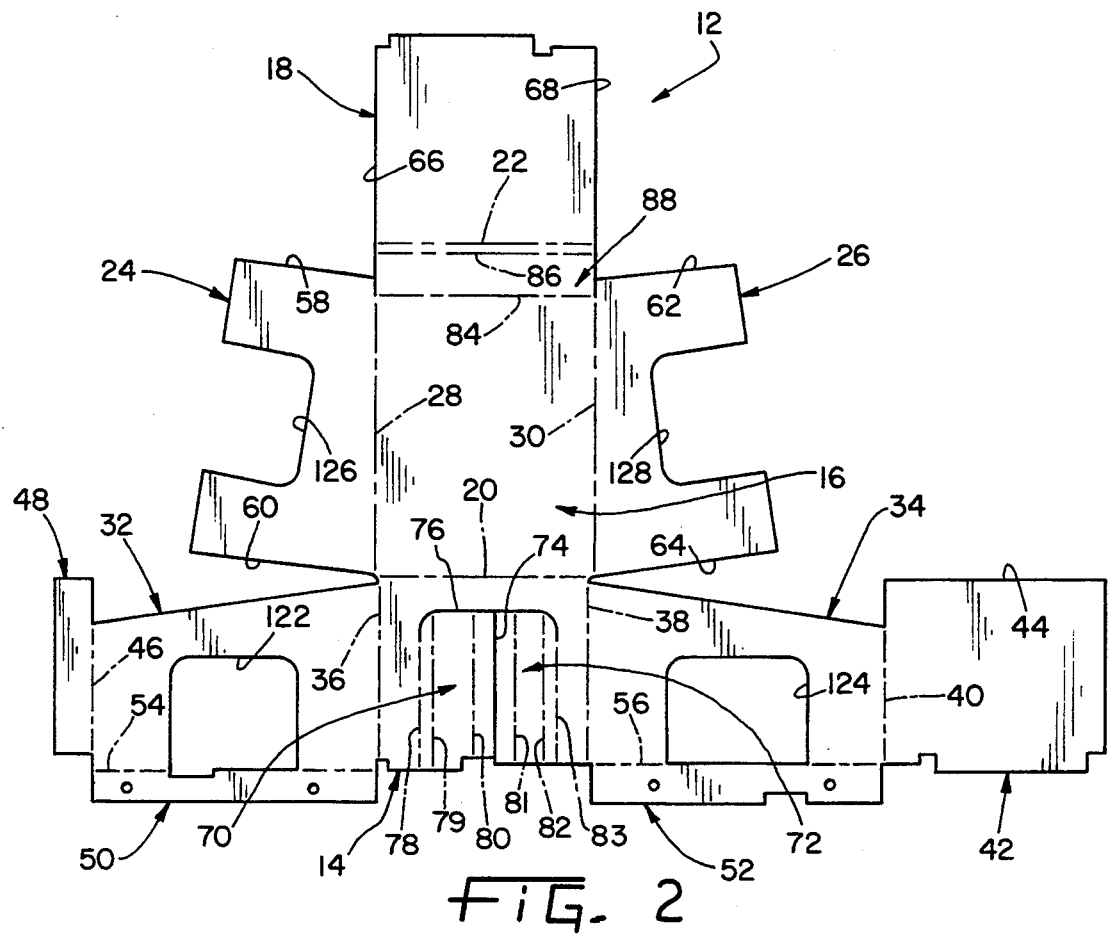
FIG. 2 is a plan view of the blank for the seat body.
FIG. 3 is a plan view of the blank for the seat support.

Referring now to FIG. 1, there is shown a temporary seat 10 formed from a first blank 12. Blank 12, as shown in FIG. 2, is divided into front panel 14, top panel 16, and rear panel 18 by fold lines 20 and 22. A pair of exterior side panels 24 and 26 are separated from top panel 16 by fold lines 28 and 30. Extending from front panel 14 are two interior side panels 32 and 34. These interior side panels 32, 34 are separated from front panel 14 by fold lines 36 and 38 which also serve as side edges or attachment portions to front panel 14. Attached to interior side panel 34 by means of an attachment portion or fold line 40 is an interior rear panel 42 having a top edge 44. A rear attachment panel 48 is connected to interior side panel 32 by means of fold line 46. While along the lower side of interior side panels 32 and 34 are laterally extending lower flange portions 50 and 52, respectively, separated from side panels 32, 34 by fold lines 54 and 56.

As shown in FIG. 2, most panels include side edges formed by fold lines such as 36, 38, 40 and 46 that act as attachment portions to other panels. Exterior side panel 24 has side edges 58 and 60 while the other exterior Side panel 26 includes side edges 62 and 64. Rear panel 18 also includes side edges 66 and 68.

Integral post members 70 and 72 of seat 10 are formed by means of cutting and folding portions of front panel 14. A central, vertical cut line 74 extends for a certain distance along front panel 14. Vertical cut line 74 terminates at a horizontal cut line 76, the two cut lines together forming substantially a T-shape. Cut lines 74 and 76 define integral post members 70 and 72 by the portions of front panel they delineate. During assembly, portions of front panel 14 are folded along a plurality of fold lines 78, 79, 80 and 81, 82, 83 for each of post member 70 and 72, respectively. Post members 70 and 72 increase the weight carrying capacity of the seat.

Blank 12 further includes an back support portion formed by fold lines 84 and 86 between top panel 16 and rear panel 18. Back support portion 88 creates a short back rest when blank 12 is assembled to prevent seat users from sliding off the seat.

Blank 12 is initially assembled into seat 10 by folding back interior side panels 32 and 34. Top panel 16 is then folded down over side panels 32 and 34 with exterior side panels 24 and 26 overlying interior side panels 32 and 34. At this time, the side panel pairs 24, 32 and 26, 34 may be attached together by means such as staples, stitching or glue as is known in the cardboard art. This creates side panels of double stacked material.

Next, the upstanding back support 88 is formed by upwardly folding support portion 88 along lines 84, 86 and 22 and folding rear panel 18 down over interior rear panel 42. Upstanding support portion 88 forms a space into which the top edge 44 of interior rear panel 42 may be inserted. This structure greatly increases the strength of the back support. Rear panel 18, rear attachment panel 48 and inside rear panel 44 are then attached together by means of staples or glue to form the solid rear side of seat 10. By having a double thick, rear panel formed by rear panels 18 and 42, the strength of seat 10 is increased. Top edge 44 disposed within upstanding portion 88 further increases the weight carrying ability of seat 10.

At this time, integral post members 70 and 72 are formed by folding back front panel 14 along fold lines 78 through 83. The area closest to cut line 74, for each support, is attached to side panels 32 and 34 as shown in FIG. 4, to create a high strength structure capable of supporting extra heavy loads. The preferred attachment method for integral post members 70 and 72 to side panels 32 and 34 is high strength, hot glue applied to the entire area where the folded portions of front panel 14 meet the side panels 32 and 34. Alternatively, integral front posts may be formed from similar cutout sections of side panels 32 and 34 folded back into contact with front panel 14. In this way, integral post members may be created to support weight without extra parts or wastage of blank material.

Next, extending lower flange portions 50 and 52 are folded up from side panels 32 and 34 to a position shown in FIG. 1. Large brass grommets are attached to flange portions 50 and 52 to provide a high strength attachment point for bolting or screwing seat 10 to the floorboard 92 of a vehicle. The use of heavy duty grommets 90 disperses the load from seat 10 to floorboard 92. The grommets 90 essentially flatten out as they are driven down into the floorboard so it does not cut through flange portions 50 and 52. Preferably, the grommet is 25% larger than the washer on the head of the bolt or screw used to attach seat 10 to floorboard 92. This size adequately protects the seat blank from rupture during seat attachment. Blank 12 then stands assembled with front panel 14 opposite rear panels 18 and 42 and side panels 24 an 32 opposite side panels 26 and 34.

To further increase the weight carrying capacity of seat 10, an underside seat support 94 is attached to seat 10. Initially, seat support 94 is formed from a second blank of sheet material as shown in FIG. 3. A substantially rectangular blank having side edges 96 and 98 are shown with extending tab members 100 and 102. Top and bottom edges 104 and 106 have a number of extending tabs 108 extending away from the blank. Centrally located in seat support 94 are slots 110 corresponding in size to tabs 108. The tabs 108 having projecting ears 112 are constructed so that they are properly sized with slots 110 so after inserted removal of tabs 108 from slots 110 is prevented.

Seat support 94 is assembled by folding the blank shown in FIG. 3 along fold lines 114 through 117 such that top and bottom edges 104 and 106 are folded to the center of support 94 so tabs 108 are inserted into slots 110. By this construction, a prismatic tube is formed as shown in FIG. 5. Portions of seat support 94, between fold lines 114 and 115 and between fold lines 116 and 117, labeled 118 and 120 respectively are substantially planar and attach to the underside of top panel 16, preferably by gluing.

Tab members 100 and 102 extending sideways from seat support 94 are likewise glued to interior side panels 32 and 34. The attachment of seat support 94 to the underside of seat 10 increases its weight carrying capacity by spreading the force of weight applied to top panel 16 through side panels 32 and 34. Alternatively, seat support 94 need not necessarily be formed into a prismatic tube but may form a square or rectangular tube member or other such shape to adequately redistribute a persons weight from panel 16. Further, instead of tabs 100 and 102 attaching to side panels 32 and 34, they may alternatively attach to front panel 14 and rear panel 42.

Side openings 122 and 124 are formed in side panels 32 and 34 with corresponding cut outs 126 and 128 in exterior side panels 24 and 26. These side openings allow personnel installing seat 10 to have adequate lighting during assembly and further allow attachment of seat 10 to floorboard 92 with personnel only on one side of seat 10. Tools and bolts may be inserted through openings 122 and 124 to attach grommets 90 on the other side of seat 10 to the vehicle floorboard 92.

Although the embodiment of seat 10, shown in FIG. 5, shows a particular seat angle 126, other seat angles may be utilized for different sized seats and vehicles.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seat, comprising:
   a first sheet of material having panels defined by fold lines, said first sheet forming a front panel, a top panel, a first rear panel and at least two side panels, each panel having an attachment portion to which at least one other panel attaches, said panels together forming a substantially box shape, said front panel opposing said rear panel, each said side panel opposing the other said side panel;
   two integral post members adjacent said front panel, said integral post members formed from cutouts of said front panel folded toward side edges of said front panel;
   a backrest support disposed between said top panel and said rear panel; and
   a second sheet of material formed into a prismatic tube, said tube attached to said top panel and a pair of opposing said panels whereby the weight bearing ability of the seat is enhanced.

2. A seat of stiff corrugated paperboard comprising:
   a first sheet of material having panels defined by fold lines, said first sheet forming a front panel, a top panel, a first rear panel and at least two side panels, each said panel having an attachment portion to which at least one other panel attaches, said panels together forming a substantially box shape, said front panel opposing said rear panel, each said side panel opposing the other said side panel; and
   a second sheet of material formed into a tube, said tube attached to said top panel and a pair of opposing said panels whereby the weight bearing capacity of the seat is increased,
   wherein each panel of a said pair of opposing panels includes a laterally extending lower flange portion, said flange portions including at least one grommet for attaching said seat to a vehicle.

3. The seat of claim 2 in which said tube is prismatic.

4. The seat of claim 2 in which said first sheet includes at least two additional fold lines between said top panel and said rear panel, said first sheet material between said additional fold lines folded upwardly out of the plane of said top panel thereby forming an upstanding backrest.

5. The seat of claim 2 in which said side panels include cutouts for reducing seat weight.

6. A seat of stiff corrugated paperboard comprising:
   a first sheet of material having panels defined by fold lines, said first sheet forming a front panel, a top panel, a first rear panel and at least two side panels, each said panel having an attachment portion to which at least one other panel attaches, said panels together forming a substantially box shape, said front panel opposing said rear panel, each said side panel opposing the other said side panel;
   a second sheet of material formed into a tube, said tube attached to said top panel and a pair of opposing said panels whereby the weight bearing capacity of the seat is increased; and
   two integral post members adjacent said front panel, said post members extending vertically downward from said top panel, whereby the weight carrying capacity of the seat is increased.

7. The seat of claim 6 in which said front panel includes two side edges, said integral post members formed from cutouts of said front panel folded toward said side edges.

8. A seat of stiff corrugated paperboard comprising:
   a first sheet of material having panels defined by fold lines, said first sheet forming a front panel, a top panel, a first rear panel and at least two side panels, each said panel having an attachment portion to which at least one other panel attaches, said panels together forming a substantially box shape, said front panel opposing said rear panel, each said side panel opposing the other said side panel; and
   a second sheet of material formed into a tube, said tube attached to said top panel and a pair of opposing said panels whereby the weight bearing capacity of the seat is increased;
   said first sheet includes at least two additional fold lines between said top panel and said rear panel, said first sheet of material between said additional fold lines folded upwardly out of the plane of said top panel thereby forming an upstanding backrest; and
   said first sheet includes a second rear panel, a portion of said second rear panel disposed within said upstanding backrest whereby said backrest is strengthened.

9. A seat of stiff corrugated paperboard comprising:
   a first sheet of material having panels defined by fold lines, said first sheet forming a front panel, a top panel, a first rear panel and a least two side panels, each said panel having an attachment portion to which at least one other panel attaches, said panels together forming a substantially box shape, said front panel opposing said rear panel, each said side panel opposing the other said side panel; and
   a second sheet of material formed into a tube, said tube attached to said top panel and a pair of opposing said panels whereby the weight bearing capacity of the seat is increased, and wherein each said side panel is formed from double stacked material.

10. A seat of stiff corrugated paperboard comprising:
    a first sheet of material having panels defined by fold lines forming a front panel, a top panel, a first rear panel and at least two side panels, each panel having side edges and an attachment portion to which at least one other panel attaches, said panels together forming a substantial box shape, said front panel opposing said rear panel, each said side panel opposing the other said side panel; and
    two integral post members adjacent said front panel, said integral post members formed from cutouts of said front panel folded toward said front panel side edges whereby the weight bearing capacity of the seat is increased.

11. The seat of claim 10 in which each panel of a said pair of opposing panels includes an extending lower flange portion, said flange portions including at least one grommet for attaching said seat to a vehicle.

12. The seat of claim 10 further including a second sheet of material formed into a tube, said, tube attached to said top panel and a said pair of opposing panels.

13. The seat of claim 12 in which said tube is prismatic.

14. The seat of claim 10 in which said first sheet includes at least two additional fold lines between said top panel and said rear panel, said first sheet material between said additional fold lines folded out of the plane of said top panel forming thereby an upstanding backrest.

15. The seat of claim 14 in which said first sheet includes a second rear panel, a portion of said second rear panel disposed within said upstanding backrest whereby said backrest is strengthened.

16. A seat of stiff corrugated paperboard comprising:
   a first sheet of material having panels defined by fold lines forming a front panel, a top panel, a first rear panel and at least two side panels, each panel having side edges and an attachment portion to which at least one other panel attaches, said panels forming a substantially box shape, said front panel opposing said rear panel, each said side panel opposing the other said side panel, each panel of a said pair of opposing panels having an extending lower flange portion including at least one grommet for attaching said seat to a vehicle;
   two integral post members adjacent said front panel, said integral post members formed from cutouts of said panel, said cutouts folded toward said side edges of said front panel;
   an upstanding backrest disposed between said top panel and said rear panel; and
   a second sheet of material formed into a prismatic tube, said tube attached to said top panel and a pair of opposing panels whereby the weight bearing capacity of the seat is enhanced.

17. The seat of claim 16 in which said first sheet includes a second rear panel, a portion of said second rear panel disposed within said upstanding backrest whereby said backrest is strengthened.

* * * * *